July 1, 1930.  R. E. RILEY  1,768,933
METHOD OF MAKING HAND GRIP SLEEVES
Filed Jan. 12, 1929
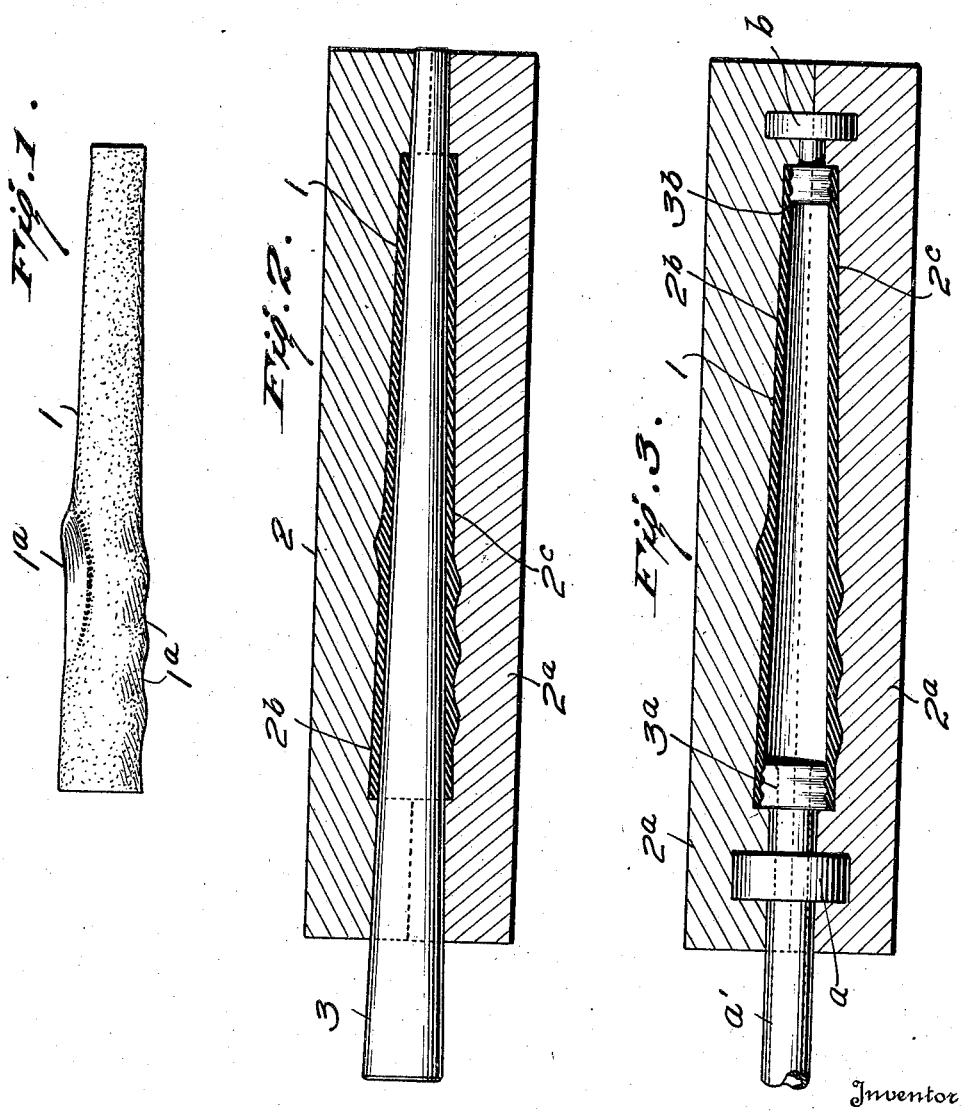
Inventor
RALPH E. RILEY,
By Middleton Donaldson & Hall
Attorneys Patented July 1, 1930

1,768,933

UNITED STATES PATENT OFFICE

RALPH E. RILEY, OF AKRON, OHIO, ASSIGNOR, BY MESNE ASSIGNMENTS, TO THE MILLER RUBBER COMPANY, INC., OF WILMINGTON, DELAWARE, A CORPORATION OF DELAWARE

METHOD OF MAKING HAND-GRIP SLEEVES

Application filed January 12, 1929. Serial No. 332,025.

My said invention relates to improvements in hand grip sleeves adapted for various articles but designed more particularly for golf club shafts, and to the method of making the same.

The invention aims to provide a sleeve which can be produced as an article of manufacture and shipped to the club manufacturers or to the public generally ready for easy application to the club handle to produce an effective non-slipping grip portion.

The invention further aims to provide a sleeve of this character which will permanently retain its non-slipping characteristics.

The invention further aims to provide a novel method by which the sleeves may be rapidly and economically manufactured, and the comminuted cork which produces the non-slipping characteristics will be embedded in the carrying sleeve and firmly united thereto.

With these and other objects in view, the invention includes the novel article and method of making the same hereinafter described, the invention being defined by the claims appended hereto.

In the accompanying drawings:

Figure 1 is a view in side elevation showing my improved sleeve.

Fig. 2 is a view of a mold with the sleeve therein to illustrate the carrying out of the method.

Fig. 3 is a similar view to illustrate a modification.

In proceeding according to my invention, I mold a tube 1 of rubber compound or analogous material in a two part mold comprising upper and lower members 2 and $2^a$, having mold cavities $2^b$ and $2^c$ to cooperate with the mandrel or core 3, the ends of which are held in recesses in the mold sections.

The cavities and core are so shaped that a tapered tubular sleeve will be produced, and they may be provided with irregular or wavy portions whereby corresponding ridges will be produced in the sleeve to serve as finger markings, as indicated at $1^a$. The sleeve thus formed of unvulcanized material is partially vulcanized, as by placing the mold in a suitable vulcanizing press.

After such partial vulcanization, the sleeve is removed from the mold and is given one or more coats of rubber cement, preferably by making two dips of the sleeve in the cement and allowing the cement to drain from the sleeve at one end after the first dip and from the other end after the second dip.

The sleeve is then brought into contact with comminuted or powdered cork, which adheres to the surface thereof. Such contact may be produced by sprinkling the sleeve with the cork or rolling the sleeve on the cork while the latter is suitably supported.

The coated sleeve is then placed back in the same mold, or in a similar one having a cavity slightly larger than the first to compensate for the thickness of cork, and vulcanization is completed under sufficient pressure (which need not be as great as the pressure during partial vulcanization), which causes the cork particles to be embedded in the surface of the sleeve and to be vulcanized thereto so as to be incapable of being dislodged.

The resulting sleeve, by reason of the embedding of the cork particles, has a smooth exterior surface which, due to its cork covering, possesses the desired non-slipping characteristics, while at the same time the resiliency of the sleeve is not interfered with, and it is capable of being distended for application to the club shaft or analogous handle, to which it will firmly adhere on contraction.

By reason of their firm connection with the sleeve, the individual cork particles, though permitting stretching of the sleeve, cannot become detached therefrom.

Instead of using a core to define the interior of the sleeve during preliminary or final vulcanization, I may provide core plugs $3^a$ and $3^b$ within the ends of the sleeve, as shown in Fig. 3, these plugs having parts $a$ and $b$ clamped within recesses in the molds, and one of them ($a$) having a hollow stem $a'$ through the bore of which air or other fluid may be forced to expand the sleeve during vulcanization.

The purpose of partial vulcanization is to get the sleeve in a condition where it can be handled in applying the comminuted cork without liability of distortion, and yet have a surface which will be susceptible of vulcanization, whereby the cork particles will be vulcanized in place in their embedded condition.

As a modification of the process hereinbefore described, I may carry the vulcanization of the sleeve further and to the point of complete vulcanization before the cork is applied, and thereafter give said sleeve a coating of a vulcanizable cement, preferably of a thickness which will enable the particles to become embedded therein. I then sprinkle or evenly distribute the comminuted cork over the cement covered surface and subject the article to further vulcanization as in the first method described, which vulcanizes the vulcanizable cement and thus vulcanizes the particles in place in the cement and the cement to the sleeve.

Having thus described my invention, what I claim is:

1. The hereindescribed method which consists in forming a sleeve of partially vulcanized vulcanizable material, applying comminuted anti-slipping material to the exterior surface thereof, and completing the vulcanization.

2. The hereindescribed method which consists in forming a sleeve of partially vulcanized vulcanizable material, applying comminuted anti-slipping material to the exterior surface thereof, and completing the vulcanization under sufficient pressure to cause the particles to become embedded in the material and vulcanized thereto.

3. The hereindescribed method which consists in forming a sleeve of partially vulcanized rubber, applying cork particles to the surface thereof, and completing the vulcanization.

4. The hereindescribed method which consists in forming a sleeve of partially vulcanized rubber, applying a coating of rubber cement to the exterior surface thereof, applying a layer of evenly distributed comminuted cork to the cement covered surface, and completing the vulcanization.

5. The hereindescribed method which consists in forming a sleeve of partially vulcanized rubber, applying a coating of rubber cement to the exterior surface thereof, applying a layer of evenly distributed comminuted cork to the cement covered surface, and completing the vulcanization, under sufficient pressure to cause said comminuted cork to be embedded in the rubber and vulcanized thereto.

In testimony whereof, I affix my signature.

RALPH E. RILEY.

CERTIFICATE OF CORRECTION.

Patent No. 1,768,933.                                         Granted July 1, 1930, to

RALPH E. RILEY.

It is hereby certified that the assignee in the above numbered patent was erroneously described and specified as "The Miller Rubber Company" whereas said assignee should have been described and specified as Miller Rubber Company, Inc., of Wilmington, Delaware, a corporation of Delaware, as shown by the records of assignments in this office; and that the said Letters Patents should be read with this correction therein that the same may conform to the record of the case in the Patent Office.

Signed and sealed this 26th day of August, A. D. 1930.

(Seal)                                                       M. J. Moore,
Acting Commissioner of Patents.